United States Patent [19]

Grosskopf

[11] Patent Number: 4,873,653
[45] Date of Patent: Oct. 10, 1989

[54] MICROSCOPE SYSTEM FOR PROVIDING THREE-DIMENSIONAL RESOLUTION

[75] Inventor: Rudolf E. Grosskopf, Koenigsbronn, Fed. Rep. of Germany

[73] Assignee: Carl-Zeiss-Stiftung, Heidenheim/Brenz, Fed. Rep. of Germany

[21] Appl. No.: 243,150

[22] Filed: Sep. 9, 1988

Related U.S. Application Data

[63] Continuation of Ser. No. 850,487, Apr. 9, 1986, abandoned.

[51] Int. Cl.$^4$ .................... G02B 26/00; G06F 15/62; G06G 9/00
[52] U.S. Cl. .................... 364/525; 350/162.12; 350/507; 364/713; 364/728.01
[58] Field of Search ........... 364/525, 713, 822, 728.01; 350/162.12, 162.13, 507, 509

[56] References Cited

U.S. PATENT DOCUMENTS

| | | | |
|---|---|---|---|
| 2,660,923 | 12/1953 | Benford | 350/509 |
| 4,118,107 | 10/1978 | Parrent, Jr. et al. | 350/162.13 |
| 4,150,360 | 4/1979 | Kopp et al. | 350/162.12 |
| 4,164,788 | 8/1979 | Jain | 364/525 |
| 4,202,037 | 5/1980 | Glaser et al. | 364/525 |
| 4,359,282 | 11/1982 | Garrison | 350/507 |
| 4,360,269 | 11/1982 | Iwamoto et al. | 350/162.12 |
| 4,360,885 | 11/1982 | Edgar | 364/525 |
| 4,389,093 | 6/1983 | Jackson | 350/162.14 |

FOREIGN PATENT DOCUMENTS

3200038 7/1983 Fed. Rep. of Germany.
1595422 8/1981 United Kingdom.

OTHER PUBLICATIONS

Boyle et al.: The Minicomputer as a Microscope Accessory Proceedings of the 12th Annual Rocky Mountain Bioengineering Symposium, Apr. 1975, pp. 79–83.
Lund et al.: Measurement of Two–Dimensional Optical System Modulation Transfer Function, SPIE vol. 192, Interferometry, pp. 166–173.
Journal of the Optical Society of America, vol. 2, No. 2, Feb. 1985, pp. 121–127, N. Streibl, "Three–dimensional imaging by a Microscope".

*Primary Examiner*—Felix D. Gruber
*Attorney, Agent, or Firm*—Walter Ottesen

[57] ABSTRACT

A microscope with convolution wherein the light distribution is modulated within the space of double light cones generated by the optics of the microscope. The modulation is accomplished in space domain as opposed to modulation in the time domain used in radio frequency electronics. Light radiation is modulated by placing a modulation pattern in one of the planes of the microscope where the illumination source is focused. The modulated light passes through the other sections of the microscope after which time it strikes a target of a TV camera tube. The output of the TV tube is then fed into a computer. In the object of the microscope there are, for example, 64 consecutive object positions at which 64 consecutive focused images of the object can be formed so as to generate digitized images in the computer. The pattern from which the image is formed is stored in a memory and then reconvolved using an algorithm which constructs a reconvolution of the object by sensing the presence and absence of the hollow sections of the light modulated cones. The algorithm takes into account the modulating pattern and the quality of the image generated within the microscope optics. To match the algorithm with the modulating pattern or patterns used in the microscope a matrix of data representing a three-dimensional pulse response function is generated using a Fourier transformer or any other convolving algorithm. This data matrix takes into account the behavior of the optics of the microscope and is converted by a reconvolving algorithm into improved images. These images have a superior 3-D resolution not achievable with the same speed by other methods.

8 Claims, 8 Drawing Sheets

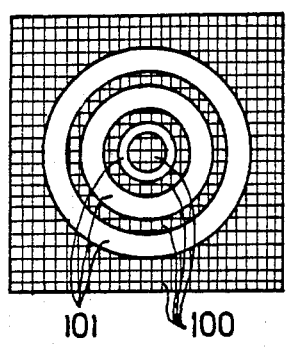
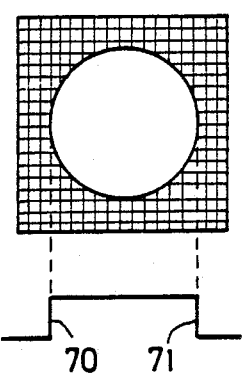
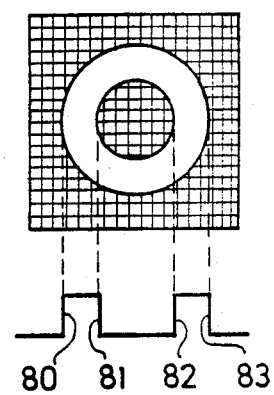
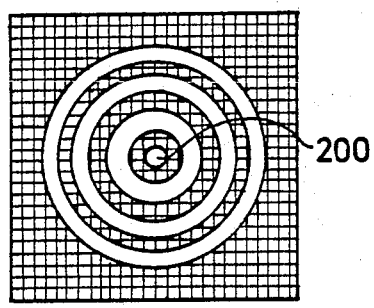
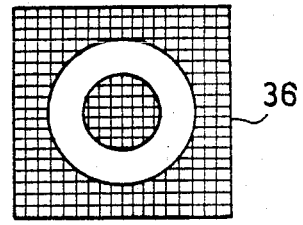
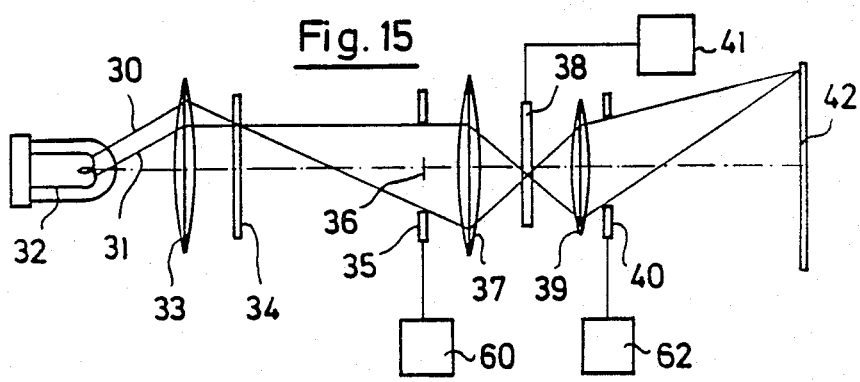

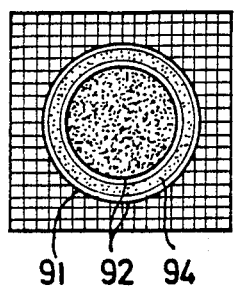 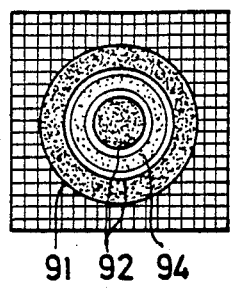 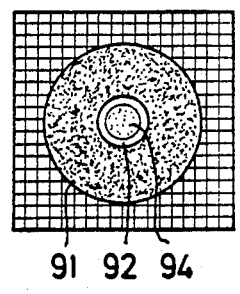
Fig.21a  Fig.21b  Fig.21c
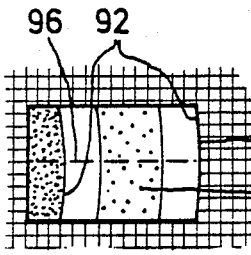
Fig.22a
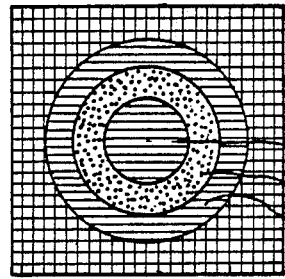
Fig.23a
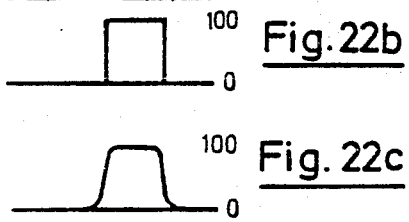
Fig.22b
Fig.22c
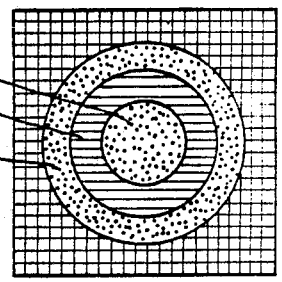
Fig.23b
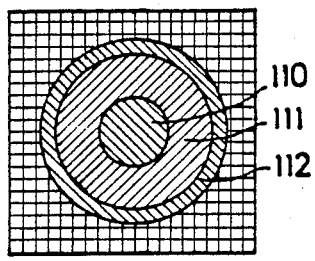
Fig.24a
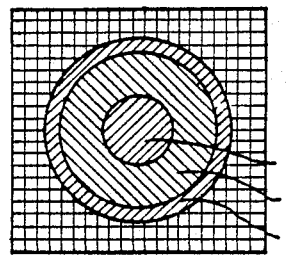
Fig.24b

MICROSCOPE SYSTEM FOR PROVIDING THREE-DIMENSIONAL RESOLUTION

This is a continuation of co-pending application Ser. No. 850,487 filed on Apr. 9, 1986 now abandoned.

BACKGROUND OF THE INVENTION

For transparent and semitransparent objects, mainly in the life sciences, a microscope with internal light transmission is normally used. To make objects visible, the four most important optical effects are: absorption, scattering, phase shifting and fluorescence.

The convolution described herein can be used for objects with the properties of absorption, scattering, a gradient of refractive index and fluorescence. However, important practical applications are with the optical effects of absorption and scattering and this description focuses on microscopes used for absorbing and scattering objects.

FIG. 1 shows a prior art system in which a microscope transmits light from a light-emitting filament 20 through a collector lens 21. The collector lens causes the light to be bent in a manner such that parallel beams, such as beams 18 and 19, are caused to intersect each other in the plane of a radiant field stop 22. Light then passes through an aperture field stop 23. A condenser lens 24 focuses the illuminating light onto an object 25 to be magnified. This object is typically a transparent object with light absorbing regions and scattering regions such as biological cells or tissues. These cells or tissues are typically placed on a pane of glass and covered with another very small and thin pane of glass. This arrangement is referred to as a microscope slide or object or specimen. The light not absorbed by the object 25 enters an objective 26 and then passes through an objective output pupil 27 and is focused onto a plane where a target 28 of a TV camera tube is located. The TV camera tube captures the images for the microscope. A normal microscope with eyepieces has a field stop at location 28 which is followed by a binocular. The present invention is not intended for this type of microscope because the images would be deteriorated by the arrangements of this invention.

There is an important fact concerning the light path shown between the condenser lens 24 and the objective 26. The light of the two original parallel beams, shown as dotted lines 18 and 19, from the filament 20 defines a double cone 29 which intersects in the object 25. There exist as many double cones as there are pixels in an optical image. Each of the more than 100,000, typically a million, double cones stem from parallel light emitted by the filament 20. The image projected to the TV tube target 28 is a convolution of the object 25. As shown in FIG. 1, the apexes 30 of the double cones form a plane. Only those details of the objects which lie in this plane are in focus. The further away the details of the object are from the focus plane, the less the details can be recognized in the image that is projected to the TV target.

State-of-the-art microscopes have a manually operated gear which moves either the object 25 or the objective 26 or a lens in the objective in the direction of the axis of the system in order to focus on successive planes of the object. However, the image contains not only the details in the focal plane but also the defocused details of other parts of the object. This leads to severe disadvantages from which all light microscopes suffer. As the object becomes thicker, the resolution achieved for details in the focal plane deteriorates. This situation is exacerbated when stained objects contain many details distributed over a large volume.

To overcome this problem in the field of biological research and other sciences, specimens are cut into very thin layers using microtomes. This is a time-consuming method, often needing refrigeration or freezing of the object before cutting, and it cannot be applied to achieve images from living cells. Therefore, computers have been used to convolute sequences of microscopic images which have been stored in computer memory by stepping from one focal point to the next. Detail with respect to the foregoing are provided in U.S. Pat. No. 4,360,885 incorporated herein by reference. Additional details on the above are described in literature such as Ehrhard, Zinser, Komitowski, Bille, *Reconstructing 3-D Light-Microscope Images by Digital Image Processing,* Applied Optics, Vol. 24 pp. 194–200. The convolution can be done by applying a three-dimensional Fourier transform to a cube of $64 \times 64 \times 64$ pixels with eight bits each. This yields a new set of $64 \times 64 \times 64$ pixels, but now in frequency domain. It may be called the Fourier data cube. By the same method the double cone is also transformed into frequency domain. It may be called the Fourier instrument function. The reciprocal of the Fourier instrument function is computed and multiplied with the Fourier data cube. The result of this product of the image data and the reciprocal of the instrument function computed in frequency domain is the improved image data still in frequency domain. It then is treated with the inverse Fourier transform. The result is the desired data of the specimen improved by convolution.

This is a very powerful mathematical method. However, the results are discouraging because the images displayed on a TV screen after computation are not as detailed as needed for practical applications and because too much noise deteriorates the images.

A phase contrast microscope, such as that shown is U.S. Pat. No. 2,660,923, looks similar to the invention which will be described later. Phase contrast microscopes are built to generate images from details of objects which are differentiated by their phase shifting details as opposed to absorption or scattering characteristics. The microscope as shown in FIG. 1 would not show the phase shifting details. The microscope of FIG. 1 has an aperture field stop 23 and an objective outlet pupil 27 which are both shaped as shown in FIG. 2. To adapt this microscope to show phase shifting properties, it is equipped with a ring-shaped aperture field stop as shown in FIG. 3 and a ring-structured objective outlet pupil as shown in FIG. 4. In both figures dark areas 22 indicate opaque regions, light areas 24 indicate 100% transparent regions and the gray-shaded area 20 in FIG. 4 indicates transparency of about 20% plus an angle shift of the light of 90 degrees. The lenses of the phase contrast microscope are designed such that the transparent ring structure from FIG. 3 is focused to the gray-shaded ring in FIG. 4, both being the same size. Thus, the direct light from the light source 20 interferes with the light diffracted by the specimen on the TV target 28. Microscopes of this type show images of different details of the object as dark and light regions. In contrast to the invention described herein, the purpose of the rings shown in FIGS. 2 and 3 is to provide different light paths for the direct and diffracted light and to shift the phase of the direct light. Annular apertures and annular structures in the light path also are disclosed for different purposes in British Pat. No. 1,595,422, in U.S. Pat. Nos. 2,660,923, 4,150,360 and 4,202,037 incorporated herein by this reference.

SUMMARY OF THE INVENTION

The present invention relates to a microscope in which light is emitted from a light source, passes through a collector lens, a radiant field stop, an aperture field stop and a condenser lens to a point where it is focused on an object. The light then passes through an objective and an objective outlet pupil and is focused onto a plane where a target of a TV tube is located. Two parallel rays of light, shown as dotted lines 30 and 31 in FIG. 5, emanating from a light-emitting filament are only two of many parallel light rays coming from the filament. These rays converge at an object. On both sides of the object, between the condenser lens and objective, there are formed two cones 29A and 29B (one double cone). When all the light rays are present, there are typically one million double cones focused at the object.

As an additional element, the system of the present invention adds a light modulation pattern in the aperture field stop or conjugate plane. For example, the modulation pattern may be a series of opaque and clear concentric rings or it may be one clear ring generating an annular aperture which will be explained in greater detail later. For specific pattern recognition purposes other specifically selected patterns can be used. This presents the possibility of a wide range of applications of the invention for pattern recognition purposes. In the present example, a series of clear and opaque concentric rings are placed at the aperture field stop position. This results in a series of light and dark spots as the double cones converge on the object in the focal plane. On either side of the focal plane, the light and dark areas will be observable. However, the light and dark spots will converge into a single light spot and no dark spot will be observable at the focal point of any particular double cone. When an unsliced cell is placed at the object, alternate parts of the cell will be illuminated and not illuminated on either side of the focal plane as far as the light of any specific spot is concerned. However, the entire part of the cell within the focal plane will be illuminated due to the focusing of the double cones. The image picked up on the TV tube is then fed to a computer which reconstructs the image according to an algorithm, contained within the computer, which corresponds to the particular light modulation pattern. If the computer detects that there are alternate light and dark spots, then it will be known that that area of the cell is not within the focal plane, but is on either side of the focal plane. These images will be rejected and the only image retained will be the image within the focal plane. The detection of the cell image is accomplished taking into account the data from a series of images from different focal planes. To acquire this data, a motor and gear will step the cell through the focal plane. As a result, the three dimensional image of the entire cell can be reconstructed.

The important aspect of this invention is the placement of a light modulation pattern at the aperture field stop. It should also be noted that the light modulation pattern can be placed at the objective outlet pupil or it can be painted on the light-emitting filament or a combination of these locations and patterns can be applied.

The procedure described improves the resolution of light microscopes for absorbing objects. In many cases, the microtome and the time-consuming slicing of objects becomes obsolete when a computer-operated microscope with a modulating pattern according to the present invention is available.

BRIEF DESCRIPTION OF THE DRAWINGS

FIG. 10 shows an example for a modulation pattern.

FIG. 11 shows an aperture field stop.

FIGS. 12, 13 and 14 show other examples of modulation patterns.

FIG. 15 shows the optics of a microscope with means to exchange modulation patterns automatically.

FIGS. 21a, 21b and 21c show a sequence as shown in FIG. 20 but with opaque rings partially blocking the DC component.

FIG. 22a, 22b and 22c show examples for the absorption profile of an apodised ring.

FIG. 23a, 23b show examples of modulation patterns used with polarizing light.

FIGS. 24a, 24b show examples of modulation patterns used with phase shifted light waves.

DETAILED DESCRIPTION

State of the art microscopes have a double cone shaped light path when used for a reconvolution operation. The double cone by itself cannot be easily detected by the pickup system and analyzed by a computer. Also, the lack of structure of the double cones causes noise when convolution takes place and, as a result, poor images are observed.

To overcome the disadvantages of the poor images obtained by reconvolution with the cone function of the microscope, means are provided to modulate the light distribution within the space of the double cone. This enhances the high-frequencies in the light path at all places except the focal plane. It is not the usual modulation in time domain but, as mentioned, it is accomplished in a space domain. This is done by using a modulation pattern placed in one of the planes where the illumination source is focused. A sequence of, for example, 64 images with 64 different focus positions of the object is stored in a memory and is then convolved using an algorithm which reconstructs the convolution of the images of the specimen in the object with the aid of the pattern-modulated light cones. This algorithm takes into account the modulation pattern and the quality of the images generated within the microscope object when reconstructing the images of the specimen in the object. Typically, this is done by using a Fourier transform.

The creation of an image in optical systems can be thought of as a three-dimensional convolution of the object with a pulse-response-function typical for the optical system used.

To reconstruct objects from three-dimensional images and for similar purposes it is advantageous to do a three-dimensional convolution in electronics. This process is explained in the literature in K. R. Castleman, *Digital Image Processing*, Prentice Hall (1979), William K. Pratt, *Digital Image Processing*, Wiley & Sons (1978), Blahut R. E., *Fast Algorithms for Digital Signal Processing*, Addison-Wesley Publ., Owego, N.Y., 1985 incorporated herein by this reference. For that purpose the procedure is as follows.

Given a three-dimensional object-function o (x, y, z), and a three-dimensional pulse response function m (x, y, z), the image i (x, y, z) is created by $$i(x, y, z) = o(x, y, z) * m(x, y, z). \quad (1)$$

The * symbol stands for correlation.

In the frequency-domain the correlation becomes a multiplication:

$$I(u, v, w) = O(u, v, w) * M(u, v, w). \quad (2)$$

Here I is the created image in frequency domain, O is the three dimensional true object function in frequency domain and M is the three dimension pulse response function in frequency domain.

In order to reconstruct or enhance the object from the three-dimensional image, the inverse operation has to be done in the computer. It is called convolution:

$$OC(u, v, w) = I(u, v, w) * M^{-1}(u, v, w) \quad (3)$$

and in space domain $$OC(x, y, z) = FFT^{-1}(OC(u, v, w)). \quad (4)$$

Figure 18:
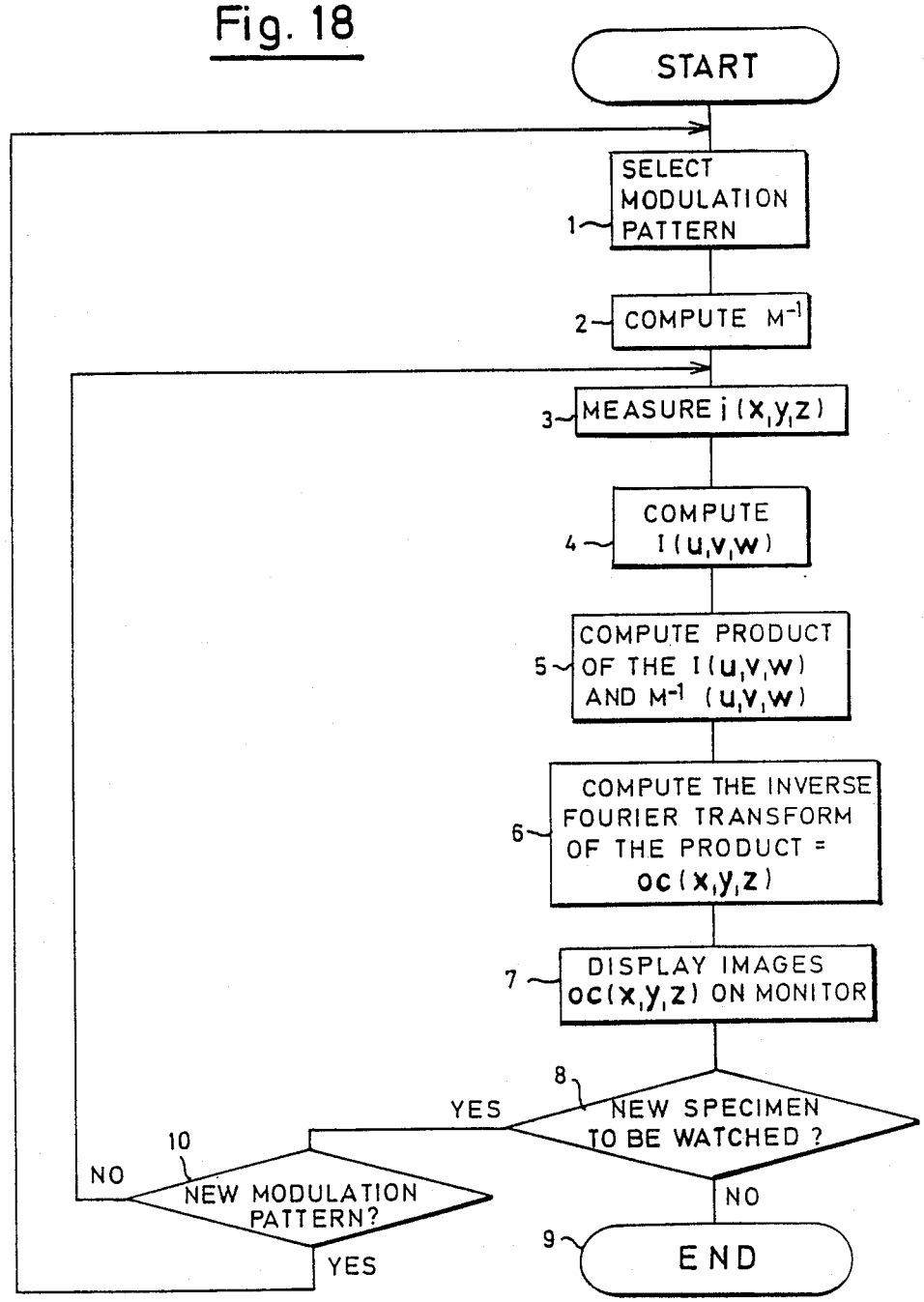
FIG. 18 shows a flow chart appropriate to do the reconvolution using the Fourier Transform.

OC is the reconstructed object in frequency domain and OC is the desired reconstructed object in space domain. $\approx M^{-1}$ is the approximate reciprocal of M and $FFT^{-1}$ is the inverse Fourier transform. The operations (1) and (2) describe what happens in the image acquisition system, e.g. the microscope. The operations (3) and (4) describe the convolution in the computer. The system of the present invention enhances this process with modulating patterns in the radiation path of the image acquisition system. The modulation pattern modifies the three dimensional pulse response function m and M in a specific beneficial manner. FIG. 18 shows the flow chart of a typical computer program for implementing the desired convolution.

In FIG. 18, the flow chart progresses from block 1 to block 7 in order. In block 8, if a new specimen is not going to be observed, then the program proceeds to block 9 wherein the program is exited. If a new specimen is to be watched, then the program progresses to block 10. If a new modulation pattern is not used, then the program proceeds to block 3 to repeat the observation of the specimen and the data is then processed in sequence as before. If a new modulation pattern is selected in block 10, then the program returns to block 1 wherein a modulation pattern is selected and the measurements and computations are performed for the new modulation pattern and specimen.

In this application of well known convolution processes, i (x, y, z) is a real function measured for example by a video camera.

As already mentioned m (x, y, z) can approximately have the shape of a double cone with the top of both cones at x=y=z=o. It has the same detailed inner structure described in N. Streibl, *Untersuchungen zur dreidimensionaler optischen Bildentstehung und Bildverarbeitung Diss.* Universitat Erlangen-Nurnberg (1984) incorporated herein by this reference. The intensity inside the cones is approximately proportional to $$\frac{1}{Z}2$$

where "Z" is the axis of the double cone. To acquire its actual shape it can be computed or measured.

The goal is to accomplish a 3-dimensional convolution quickly, with limited RAM and with limited disk speed and size by raising the exponent from 2 to a higher value and to improve the $$\frac{1}{Z}2 \text{ characteristic.}$$

The preceding mathematical method uses the frequency domain. However, taking into account the availability of processors for fast convolutions, convolution in the space domain can be accomplished. A mathematical procedure appropriate for this is the singular value decomposition described in the book by William K. Pratt, previously mentioned.

Figure 19:
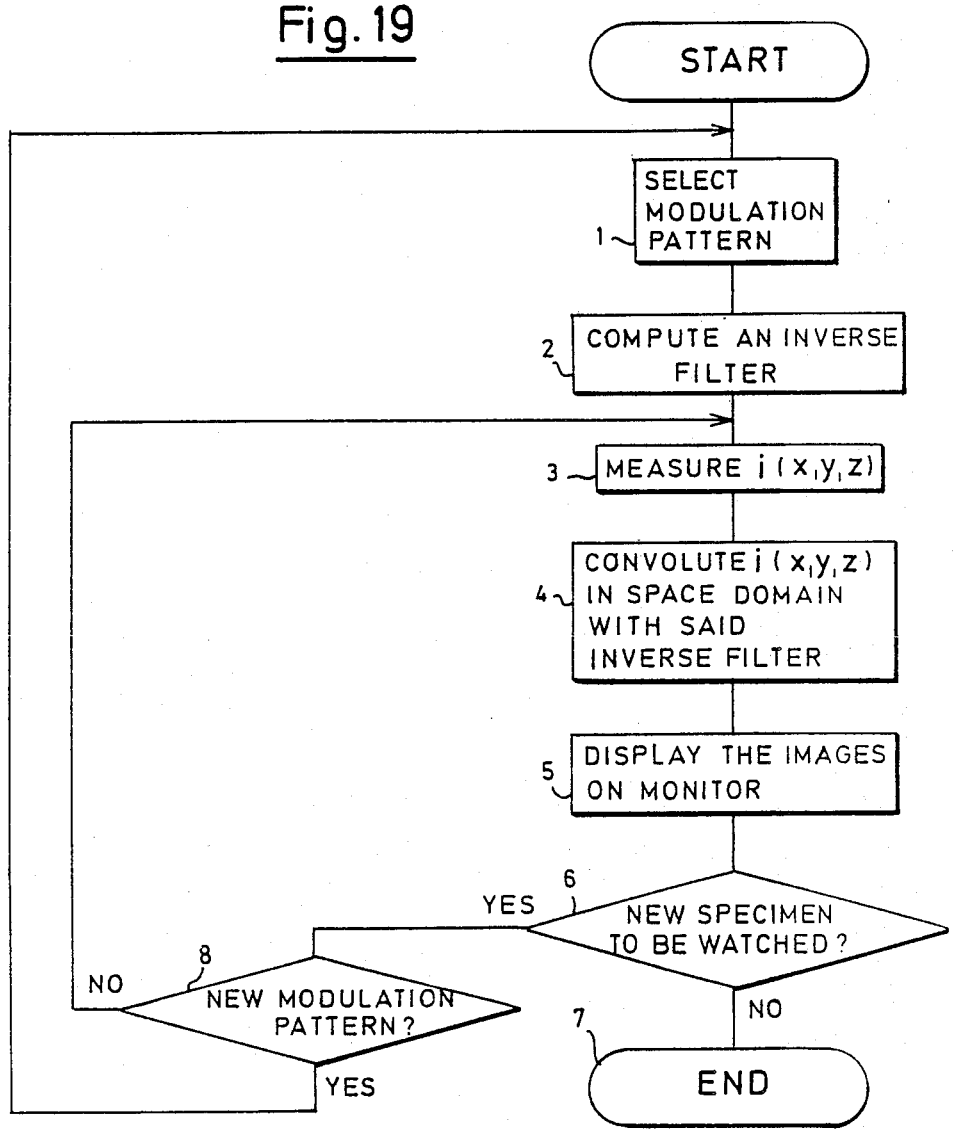
FIG. 19 shows a flow chart as FIG. 18 but using reconvolution in space domain.

FIG. 19 shows the flow chart of a program working with convolution in space domain.

This flow chart is similar to the flow chart in Figure 18. The program exits through block 7 and if a new specimen is to be observed, then the measurements starting in block 3 are repeated. If both a new specimen and a new modulation pattern are used, then the program returns to block 1 for selection of the new modulation pattern.

Although this process with the modulation pattern can be used for all types of systems generating images with radiation it is described in the following only for microscopes designed to show images from absorbing, scattering and phase shifting objects. FIGS. 5, 6, 15 and 17 show examples of a design of a microscope with a modulation pattern and a computer suitable for the exploitation of the benefit of the invention. An appropriate computer is the combination of a general purpose computer (e.g. a Micro Vax) and an array processor manufactured by Mercury Computers.

Figure 1:
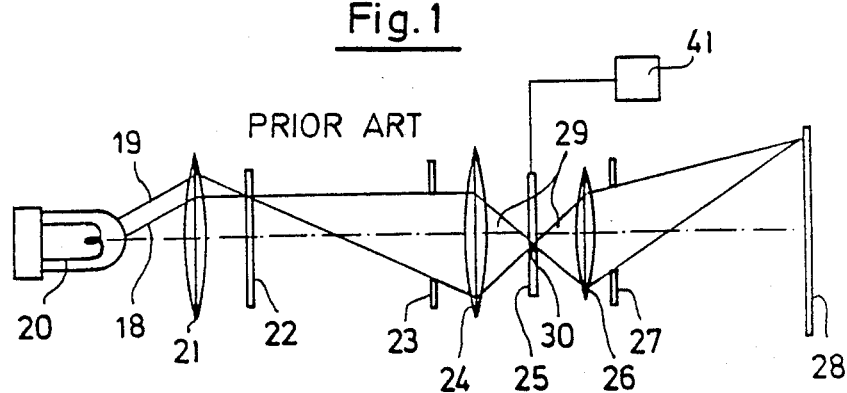
FIG. 1 shows the optics of a prior art microscope.
Figure 2:
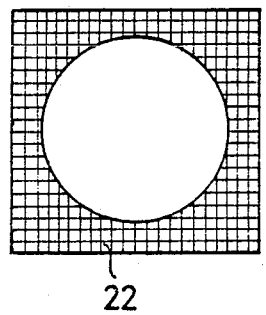
FIG. 2 shows the aperture field stop for the microscope of FIG. 1.
Figure 3:
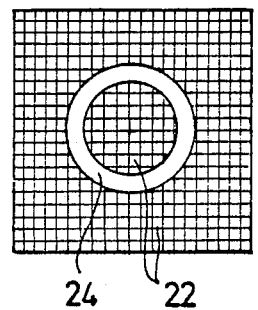
FIG. 3 shows the aperture field stop for a phase contrast microscope.
Figure 4:
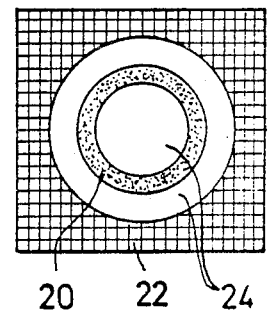
FIG. 4 shows the objective outlet pupil for a phase contrast microscope.
Figure 5:
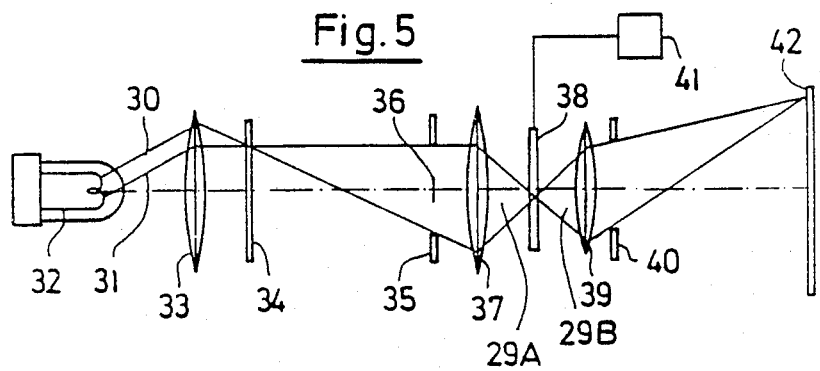
FIG. 5 shows the optics of a microscope according to the present invention with a modulating pattern in the plane of the aperture field stop.

FIG. 5 shows a light-emitting filament 32 and the parallel light beams represented by dotted lines 30 and 31 from the filament 32 which are bent by the collector lens 33 in a manner that they intersect in a radiant field stop plane 34. A laser can also serve as a light source with the appropriate well known means to illuminate an aperture. According to the invention, aperture modulating pattern 36 is disposed in the plane of an aperture field stop 35. A front view of the aperture modulating pattern 36 is shown in FIG. 14 which is similar to FIG. 3. It modulates the light in space domain and thus improves the well known method of convoluting such as described in the references on page 4. The light path of the microscope shows the condenser lens 37, the object 38, the objective 39, the objective outlet pupil 40 and the target of the TV tube 42. For ease of operation of the system, the invention provides a motorized gear 41 which steps the object 38 through different focus positions along the axis and which is controlled by a computer which will be further discussed. Such a focus stepping itself is well known.

Figure 6:
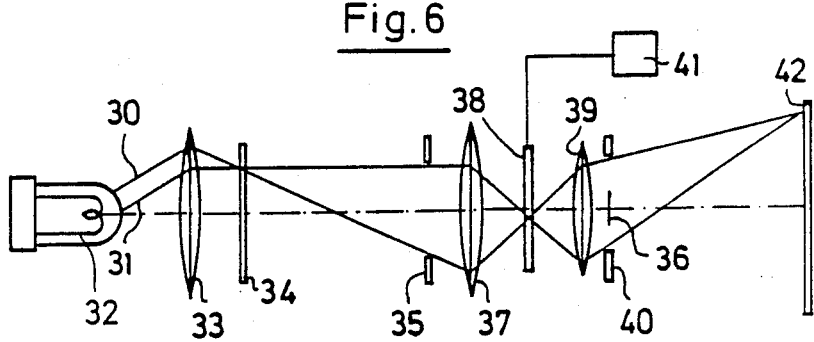
FIG. 6 shows the optics of a microscope according to the present invention with a modulating pattern in the plane of the objective outlet pupil.

FIG. 6 shows the aperture modulating pattern 36 in an alternate position. It is located in the plane of the objective outlet pupil 40. This position changes the transfer function of the objective in the manner described on pages 26 and 29 of the book by N. Streibl noted above. From this can be concluded, that only in those cases where an additional enhancement of the high frequencies is desired, the setup of FIG. 6 is advantageous as compared to the setup of FIG. 5.

Figure 7:
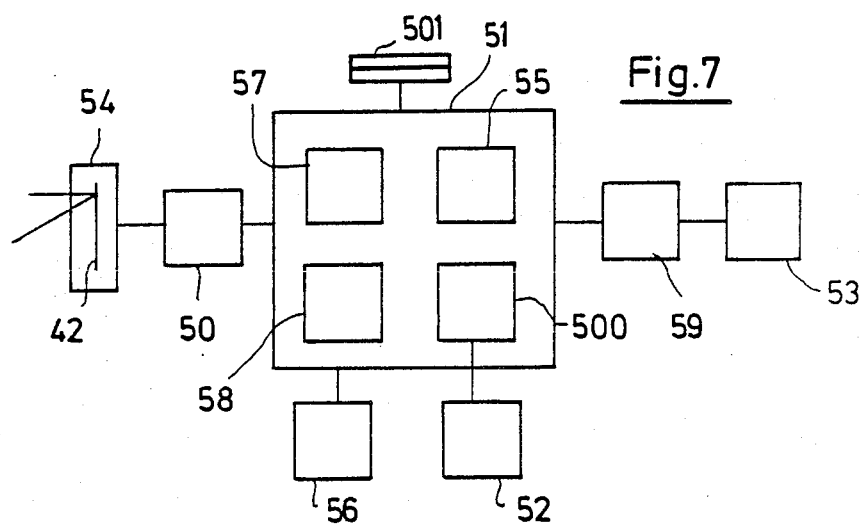
FIG. 7 shows a block diagram of a computer capable of image storage and Fourier transforms.

FIG. 7 shows again the TV target 42 within the TV camera 54. The TV signal output is connected to an A/D converter 50 and transferred to a multiple image storage memory 51 with the memory 57 being a frame grabber memory for the images from the TV-input. Memory 55 stores the images after they have been clarified. Memory 58 stores the system control software, and memory 500 has a fast data channel to the array processor 52, which does the fast convolution. A host processor 56 controls the system.

D/A converter 59 has a high speed data channel from the memory 55 and feeds a display 53 with TV-signals to display the purified images. A keyboard 501 allows the operator to control the operation of the system. Storage of the images from different focal planes of the object is synchronized in a manner so that one image from each successive focal plane is stored into one image memory location. The computer also controls the focus stepping apparatus shown as blocks 41, 60 and 62 in FIG. 15. The array processor 52 has fast access to different stored images, and transforms them with a high speed algorithm to Fourier domain. This is described in the book by William K. Pratt previously mentioned. According to the present invention, the memory 51 also stores the inverse of the Fourier transform of the microscope images taking into account the modulation in space domain performed by the aperture modulation pattern 36 of Figure 5. The images are multiplied into a Fourier transformed image data cube and then the improved data is retransformed from Fourier to space domain. The display 53 displays one or more of the improved images simultaneously. Together with the known state of the art of 3-D display, it is also possible to visualize the three-dimensional shape of the object. The image output by the system according to this invention shows as many details as the microscope theoretically can resolve. In the book by William K. Pratt mentioned above, alternate methods for the mathematical part of the reconvolution have been described which can be used instead of the FOURIER Algorithm. Convolution in space domain with the singular value decomposition is one possibility. In general, any method capable of three dimensional convolution is suitable if a computer performing it in reasonable time is available.

Figure 8:
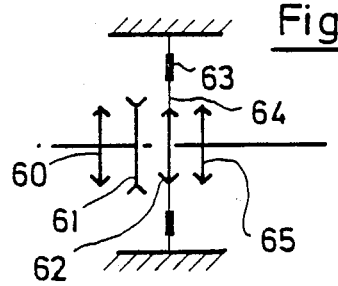
FIG. 8 diagrammatically illustrates a microscope objective with a means for fast-focus stepping.

FIG. 8 shows another means for stepping through different focus planes of the object. Lenses 60, 61, 62 and 65 are lenses of the microscope objective. The lens 62 is held by a diaphragm 64 with piezo characteristics. Electrodes 63 are supplied with an electrical voltage, not shown, and deflect the diaphragm 64 to move the lens 62 in the direction of the axis of the system. This structure is found in microscopes with automatic focusing such as microscopes with a fast focusing objective.

Figure 9:
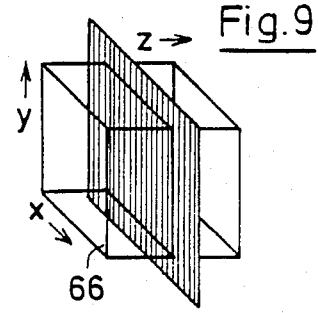
FIG. 9 shows a three-dimensional representation of a focus plane in the object.

FIG. 9 shows the area of the object where a specimen (not shown) is placed and one of the successive focus planes 66 used to construct an image of the specimen.

FIG. 10 shows another example of an aperture modulation pattern. It consists of consecutive concentric rings. Black areas 100 indicate opaque regions and white areas 101 indicate transparent regions. To achieve an appropriate improvement of the spatial resolution of the system, the invention provides an opaque region in the center of its structure. This is because light beams through the center or axis of the microscope do not contribute to its spatial resolution.

How to Determine the Best Pattern

The present invention discloses a method and apparatus to improve the resolution in the images of a specimen and to generate 3D-images. A significant problem to be solved is the selection of a suitable pattern to generate an appropriate transfer function for the imaging system of the microscope. Wherever possible, a very short pulse or small volume is used as a transfer function for the purpose of sampling in measuring and imaging systems. This pulse should be as close as possible to the so called Dirac pulse described in the book by Pratt previously mentioned. For example, in the well known x-ray operated computertomography a very thin beam of x-ray is used and the human body is rotated to sample its transparency at different angles. A computer stores the measured transparencies and computes an image of a cross section of the body, showing bones, tissue and also, if present, tumors.

However, this cannot be done in light microscopy. Thin enough beams cannot be used, because scattering would deflect too much light. Microscope manufacturers learned from E. Abbe, *On the Theory of the Microscope and on Microscopic Perception,* Archiv für mikroskopische Anatomie 9 (1873), p. 413 incorporated herein by this reference, that it is necessary to provide a large aperture in the microscope. One might also say that it is necessary to have a "thick" beam. Also, it is not a practical procedure to rotate small cells or tissues in routine applications.

The invention discloses a method and an apparatus to perform the method which meet both needs: 1, to have a large enough aperture, and 2, to avoid the need of rotating the specimen. To achieve these goals it is necessary to improve the resolution in the direction of the axis (z-direction) of the system and to enhance the modulating interaction between the light and the specimen during focus stepping. The aperture modulating pattern as shown in FIG. 14 has two characteristics that serve these purposes. First, the center part of the light cone is darkened to extinguish the light not contributing to the resolution in z-direction. Second, the cone structure has four edges in its cross section instead of two edges present in the cross section of the conventional full circle aperture. To explain this more clearly, FIG. 11 shows in principle the light intensity distribution in the cross section of the full circle aperture and FIG. 12 shows the distribution in the cross section of the ring aperture, the former with two slopes 70 and 71, the latter with four slopes 80, 81, 82 and 83.

As is well known by the expert, a slope is the integration of a short pulse, the mentioned Dirac-pulse, so the ring aperture of FIG. 12 provides four slopes to enhance interaction between the specimen and the instrument. This holds in spite of the fact that the slopes themselves are thin rings due to the circular symmetry of the cones.

From this explanation, it can also be concluded that even more enhancement of interaction is provided when the light path is divided into more than one concentric ring. FIG. 10 shows an example with three transparent rings. The cross section of this set of concentric cones has 12 slopes. Increasing the number of rings is limited by the resolution of the optics as determined by the diffraction of light.

The size of the center dark part in the pattern and the number of rings to be used depend on the characteristics and structures of the specimen being examined. In general, it can be said that for specimens with many small details, one wider ring gives better results and for specimens with larger, not-so-well contrasted patterns, many thinner rings would be preferred.

In addition to the explanation given, it should be mentioned that the effective aperture area in the optical system is reduced by the modulating pattern. According to the Abbes theory as stated in the book by E. Abbe previously mentioned, reduction of the aperture area deteriorates the resolution in the focus plane, the x and y direction, of the microscope. The x, y and z-directions are shown in FIG. 9. This trade off is made for improved resolution along the axis (z-direction) and for improved suppression of out-of-focus details. To limit the deterioration in x and y and still achieve enough improvement in the z-direction, it is useful to have a small transparent area in the center of the modulation pattern in the aperture field stop. An example of this is shown in FIG. 13 as area 200.

A further optimized design of patterns can be achieved by applying the theories of Radar Technique to the microscope. That can be done using the theory from W. M. Boerner, et al., Eds., *Inverse Methods in Electromagnetic Imagining*, Proc. NATO Advanced Res. Workshop in IMEI, Bad Winsheim, FR. Germany, Sept. 18-24, 1983, *NATO ASI Series*, Series C, Math. & Phys. Sci., Vol. 143, D. Reidel Publ. Co., Dordrecht, Holland, 1985, and A. B. Kostinski & W. M. Boerner, *On the Foundations of Radar Polarimetry—Part I: Coherent Case*, submitted to IEEE Trans. A&P, 1985, incorporated herein with this reference. These references disclose the theoretical state of the art useful in the design of patterns with polarizing properties, which are mentioned later in this application.

Until now, only rotational symmetric patterns have been discussed for the modulating pattern. However, parallel bars can be used when enhancement of resolution in a non-rotational symmetric way is desired.

Improvement in image resolution will be achieved when using microscopes built with the disclosed invention. It enables the users to select their specific modulating patterns. Also, the same specimen can be detected sequentially with different modulating patterns and the images can be combined by a computer into one final image cube. This will be shown in the following.

Successive Convolutions

According to the present invention, it has been shown that modulated light in the image of an object, which is thicker than the depth of focus of the imaging system, improves the resolution of the specimen in the object. This can be applied to images taken with one or more modulation of patterns in the optical system. A number of images from different focusing positions must be digitized and convoluted by the computer. If the time for shooting the images and their computation is not limited, additional resolution and more detailed information can be obtained by repeating the method. For this purpose a setup as shown in FIG. 15 provides a motorized gear 60 to exchange the modulation patterns in the illuminating path of the microscope and an additional motorized gear 62 performs the same function at the objective outlet pupil 40 of the optical system. For instance with such a setup it is possible to avoid the mentioned restriction of x,y-resolution. Therefore one imaging process is performed with the full aperture of the optical system. It determines the x,y-resolution. A second imaging process is performed with a modulation pattern reducing the aperture and improving the z-resolution, but reducing the x,y-resolution. The computer then combines the two sets of images to one final set with the full resolution in x and y and the improved resolution in the z-direction. Improved resolution in the z-direction, only is available with systems using the invention.

The Size of the Modulation Pattern

The various possible locations of the modulation pattern in the illumination light path have already been described. The following discloses a combination which attenuates the low pass characteristic of the optics. System designers and researchers have pointed out that a transillumination microscope has a low pass characteristic and that this characteristic hinders the image enhancement computation because of the low relative amplitude of the high frequency information. In this situation, the enhancement of the high frequency information in the image introduces much noise. The situation is improved by a pattern in the condensor aperture with a shape and size, which is only partially overlapping with the objective aperture. An annular modulation pattern shown in FIG. 14 again is a good choice. It is introduced into the aperture of the condensor and a corresponding objective aperture partially overlaps it. This is explained in more detail in the following paragraph.

Figure 16A:
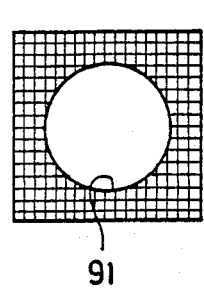
FIGS. 16a, 16b and 16c shows a combination of patterns for the illumination and for the imaging part of the optics, designed to increase the dynamic range of the system.
Figure 16B:
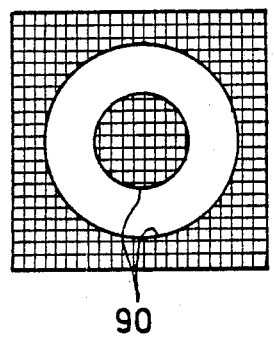
Figure 16C:
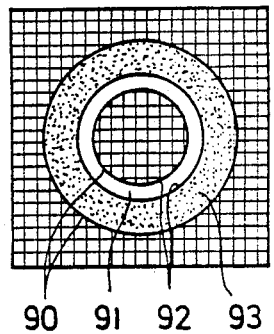
Figure 17:
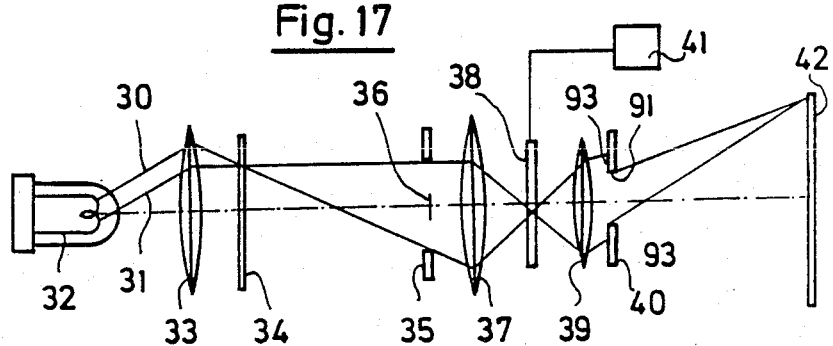
FIG. 17 shows the optics of a microscope with the patterns of FIG. 16.

The example in FIGS. 16a and b show the size of the full circle aperture 91 located in the objective and the annular aperture 90 located in the condensor. The relative size of both is shown in FIG. 16c. The light ring 92, FIG. 16c, denotes the overlapping area between the full circle aperture 91 and the annular aperture 90. Light ring 92 determines the zero frequency light amplitude in the image. Only the part of the illuminating light passing the ring 92 enters the objective aperture 91, shown in FIG. 17, because the outer diameter of the annular condensor aperture 92, shown in FIGS. 16b and c, is larger than the corresponding diameter of the objective aperture 91. The zero frequency component of the illuminating light passing the ring 93 in FIG. 16c passes the illumination part of the optics and the specimen and is blocked by the objective aperture because of its smaller diameter. However, as this light still passes the specimen, it contributes to the high frequency components of the image. In FIG. 17 the position of the opaque ring 93 in the optical system is shown.

With this design the brightness of the illumination source can be increased as compared to the case of fully overlapping apertures. This increases the signal to noise ratio of the high frequency components without overdriving the dynamic range of the image sensor (the TV-camera). This layout of the convolution pattern introduces two important advances to microscopy with reconvolution: 1, enhancing the interaction between the specimen and the instrument by introducing structure into the light path with modulating patterns as described earlier and 2, attenuation of the low pass characteristic of the transfer function of the optics so that the signal to noise ratio for the high frequency components in the image is improved significantly. The described combination of apertures is similar to the known dark field illumination microscope. However, together with the reconvolution process a fully new system is generated.

Scanning in Frequency Domain

Successive convolutions and different sizes of modulation patterns have already been discussed. Now a specific kind of successive convolution, namely a scanning process in frequency domain, is explained. This new procedure, according to the present invention, is useful when fast digital convolution and a high volume memory are available. This procedure, although feasible now, may become more important in the future as computing costs fall and computing speed increases.

Scanning in frequency domain uses an annular aperture field stop in the illumination part 35, FIG. 17, of the optics and provides means to acquire several images in each image plane as the annulus is successively diminished or increased.

Figure 20A:
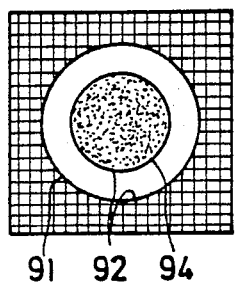
FIGS. 20a, 20b and 20c shows a sequence of modulation patterns for scanning in frequency domain.
Figure 20B:
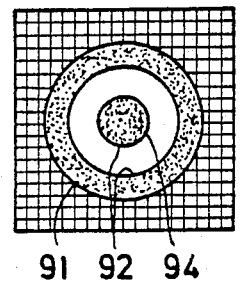
Figure 20C:
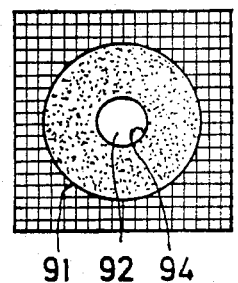

FIG. 20 shows an example. As in FIG. 16c, the modulating pattern in the condensor and the modulating pattern in the objective are shown together. FIGS. 20a, b and c show different sizes of the modulating patterns for scanning in frequency domain. The objective pupil 91 is a full circle with constant size. Three sizes of transparent rings (illumination annulus) 92 are shown as well as the opaque areas 94. However, with thinner rings, more than three successive rings are used to scan the full aperture of the objective. Also, as shown in FIG. 20c, the illumination annulus 92 has become a circle, because the inner radius reaches zero at the end of the scanning.

In each of the 64 image planes previously discussed, each of the three patterns of FIGS. 20a, b and c have to be applied during focus scanning. So in the shown example three times as much data is acquired and convoluted. Therefore an increased amount of computation is needed as compared with using only one modulation pattern.

This method yields an improved resolution and contrast, because less interaction takes place between specimen and light. The image sensor, or TV camera tube discussed earlier, gets selected information from different parts of the specimen with each change in the size of the illumination annulus 92. So the convolution becomes again more effective.

An additional improvement is achieved, when using only partially overlapping apertures in the illumination and the imaging part of the optics. This is shown in FIG. 21. The opaque rings 94 have been added in the objective field stop plane. These rings attenuate the low pass characteristics of the optics as mentioned earlier. The 3d-transfer function of the system thereby becomes more sophisticated and the necessary computations are again increased.

Apodised Apertures

The number of computations can be slightly diminished when using apodised apertures instead of the transmission profile described in FIG. 20. To demonstrate this, FIG. 22a shows a sector of the rings of FIG. 21a. In FIG. 22a, ring edge 91 denotes the circular aperture of the objective. The annular illumination aperture 92 is partially blocked by the opaque ring 94 within the circular aperture of the objective. Thus, a part of the not diffracted, i.e. the zero frequency light is prevented from reaching the image sensor. FIG. 22b shows the rectangular shape of the absorption profile of the ring 94. The absorption is 100% across the full width of the ring. As an alternate absorption distribution of the ring 94 the curve of FIG. 22c can be applied. The slope between 0 absorption and 100% absorption is smoothed due to the apodised function of ring 94 as is well known in the art. It will suppress some of the structure to be handled by the convoluting algorithm and therefore help to ease the convolution process. Also, the stability of the process is improved.

This apodisation can be applied to any of the previously described embodiments of this invention with the same benefit. However it also has two disadvantages. One is that the field stops are more expensive, the other is that the effective apertures become smaller and the resolution is a bit diminished.

Combinations

The practical layout of the optics, electronics and the modulating patterns shown are examples. The spirit of the invention is in the combination of a modulating pattern in the light path, an image-storing and convoluting computer using algorithms matched to the modulating pattern and the procedure of storing images acquired from different focal planes. Modulation patterns with absorbing structures as well as patterns with phase shifting properties and/or with polarizing properties can be used with magnifying and imaging systems incorporating the invention as will be shown in the following paragraphs. Polychromatic radiation and monochromatic radiation can be used with magnifying and imaging systems incorporating the invention. Incoherent radiation and coherent radiation can be used with magnifying and imaging systems incorporating the invention. Visible light as well as any other wavelength of electromagnetic radiation including electron beams can be used with magnifying and imaging systems incorporating the invention. Full image optics with TV-cameras and flying spot, moving stage and moving mirror-scanning systems can be used with magnifying and imaging systems incorporating the invention.

Polarizing

FIG. 23 shows the use of polarizing patterns. The modulation pattern of FIG. 23a may be located at the illumination aperture field stop. The modulation pattern of FIG. 23b may be located at the objective aperture field stop. The circle 70, the annulus 72 and the annulus 76 polarize the light in x direction and the annulus 71, the annulus 77 and the circle 75 polarize the light perpendicularly in the y direction. Thus, as explained earlier, when an absorption system is used, a diminishing of the dc component of the light can be achieved. The degree to which the dc component is diminished is determined by the relative sizes of the annuli and the circles.

Phase Shifting

FIG. 24 shows how to use a phase shifting pattern. FIG. 24a is a modulation pattern which may be located in the illumination aperture field stop. FIG. 24b is a modulation pattern which may be located in the objective field stop. The circle 110, the annulus 112 and the annulus 116 shift the phase of the light 90 degrees. The annulus 111, the circle 115 and the ring 117 shift the light phase 0 degrees. Thus a modulation of the light phase is accomplished, which the detection system can detect in the out of focus parts of the specimen.

Example of a Computer Program for Absorbing Objects

Figure 25:
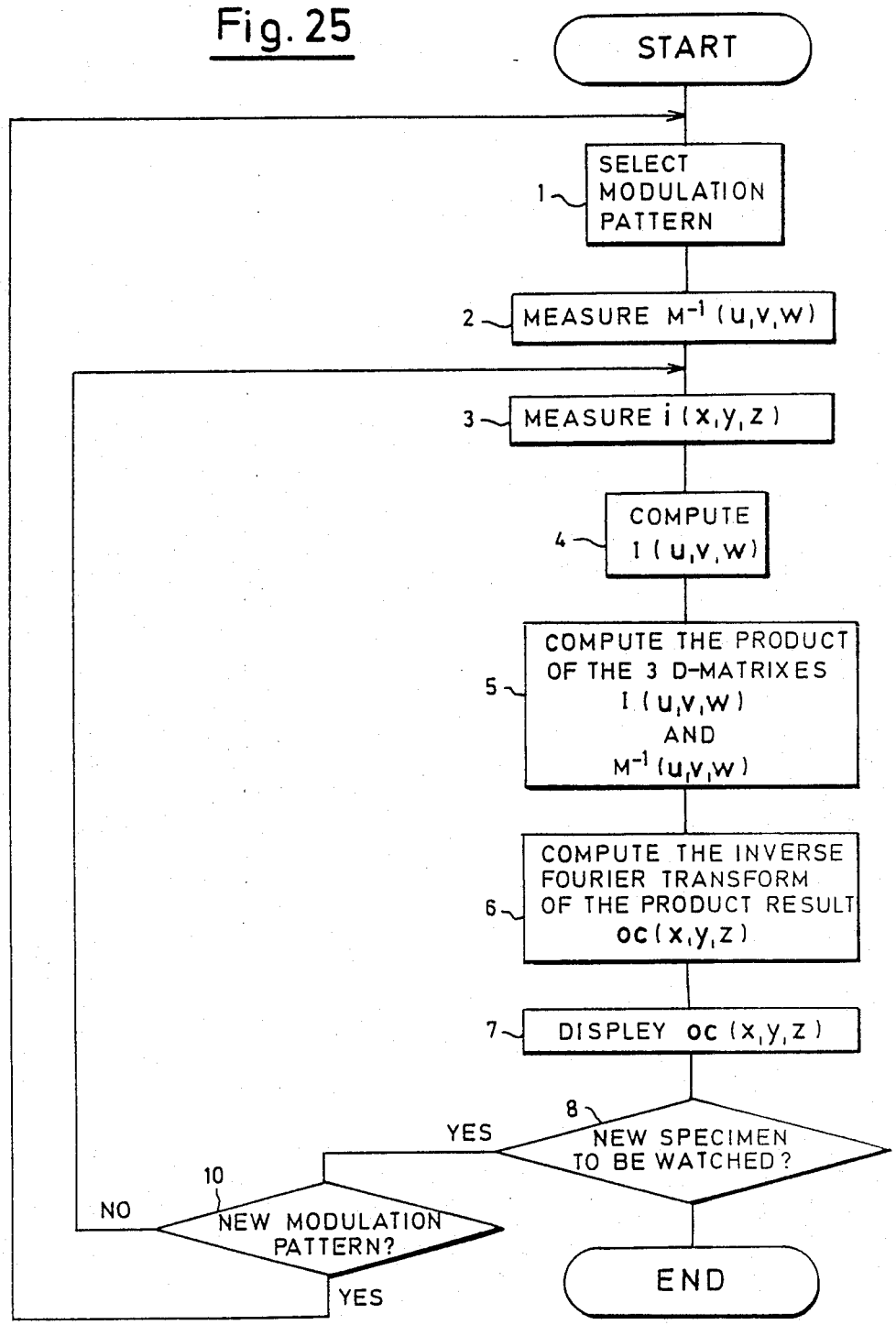
FIG. 25 shows a flow chart for the Fortran computer program. This program is shown as appendix A, not printed here but has been made a part of the file of this application.

FIG. 25 shows a flow chart for a computer program designed for absorbing objects. This flow chart is similar to the flow charts in FIGS. 18 and 19. The program exits through block 9 and block 11 repeats the measurement and computing procedure for a new specimen. Block 12 repeats the entire procedure when a new specimen and a new modulation pattern are selected. Note "A", adjacent to blocks 3 through 6, refers to the operations in blocks 3 through 6. The flow chart uses a Fourier transform as the convoluting algorithm. The specimen and the transfer function are measured by grabbing images from the television camera. A pinhole or another pulse-generating pattern is placed in the object and is used to generate an image as explained in note one on FIG. 25. Also, blank images are acquired and stored to automatically cancel any offset signals from the camera and optics.

As the process of imaging is well known from the state of the art as described in M. Born and E. Wolf, *Principles of Optics*, Pergamon Press 1980, incorporated herein by this reference, it is not necessary to point out in detail the process of imaging in the instrument and the associated computing process for the above-mentioned variations.

While a preferred embodiment of the present invention has been illustrated and described, modifications and variations thereof will be apparent to those skilled in the art given the teachings herein, and it is intended that all such modifications and variations be encompassed within the scope of the appended claims.

What is claimed is:

1. A microscope system for providing an improved three-dimensional image of a specimen having properties including a variable index of refraction and a variable absorption and said three-dimensional image being defined by low and high frequency components, the system comprising:

a light source for generating light;

collimating means for collimating the light into a light beam and transmitting the beam along an optical axis;

a specimen holder for holding the specimen on said axis downstream of said collimating means;

an objective downstream of said specimen holder for generating and transmitting images of said specimen along said axis;

focus stepping means for changing the spacing between the specimen and said objective along the optical axis whereby a plurality of said images are obtained incorporating respective values of said index of refraction and said absorption, said images being indicative of respective positions within the specimen along said axis with each of said images including data corresponding to an in-focus portion and an out-of-focus portion;

light-modulating means for modifying the in-focus and out-of-focus portions of said image by attenuating the amplitudes of the low frequency components of the image and enhancing the high frequency components thereof; and, computer means for sensing and receiving data corresponding to each of said images and for suppressing the out-of-focus portion corresponding thereto whereby an improved three-dimensional image data file of the specimen is obtained.

2. The microscope system of claim 1, said light-modulating means comprising: a first diaphragm disposed upstream of said specimen holder and defining an annular pattern.

3. The microscope system of claim 2, said light-modulating means further comprising: a second diaphragm disposed downstream of said objective and defining an aperture opening concentric with said annular pattern, and said second diaphragm being position relative to said objective so as to block a portion of the light transmitted by the latter.

4. The microscope system of claim 2, said first diaphragm defining at least two concentric rings having phase displacing and non-phase displacing characteristics, respectively.

5. The microscope system of claim 2, said first diaphragm defining at least one ring having regions of transparency and regions of opacity.

6. The microscope system of claim 2, said first diaphragm defining at least two polarizing rings having respective angles of polarization.

7. The microscope system of claim 1, said light-modulating means comprising: a diaphragm having a plurality of annuli having respective diameter; and, means for changing the diameters of corresponding ones of said annuli.

8. The microscope system of claim 1, said suppressing of the out-of-focus portion being accomplished by convolution.

* * * * *